United States Patent
Taniguchi et al.

[11] Patent Number: 5,884,243
[45] Date of Patent: Mar. 16, 1999

[54] DIAGNOSTIC SYSTEM FOR A COOLING WATER TEMPERATURE SENSOR

[75] Inventors: Satoru Taniguchi, Okazaki; Kazunori Katoh, Nagoya; Koichi Mizutani; Hideo Mori, both of Toyota, all of Japan

[73] Assignee: Toyota Jidosha Kabushiki Kaisha, Toyota, Japan

[21] Appl. No.: 879,417

[22] Filed: Jun. 20, 1997

[30] Foreign Application Priority Data

Mar. 24, 1996 [JP] Japan .................................. 8-162976
May 29, 1997 [JP] Japan .................................. 9-140285

[51] Int. Cl.$^6$ ............................ F02D 41/00; F02M 31/00
[52] U.S. Cl. ........................ 702/183; 702/130; 702/185; 364/183; 123/41.05; 123/41.12
[58] Field of Search ............................ 364/580, 551.01, 364/551.02, 183–184, 473.09; 123/41.1, 41.05, 41.15, 41.12, 479.16, 676, 571, 479; 701/101–102, 114, 108; 702/185, 183, 130

[56] References Cited

U.S. PATENT DOCUMENTS

| | | |
|---|---|---|
| 4,069,712 | 1/1978 | Armstrong et al. . |
| 4,437,342 | 3/1984 | Hosaka et al. ...................... 73/119 A |
| 4,450,812 | 5/1984 | Otsuka et al. . |
| 4,497,057 | 1/1985 | Kato et al. ...................... 701/102 |
| 4,534,214 | 8/1985 | Takahashi . |
| 4,779,577 | 10/1988 | Ritter et al. ...................... 123/41.05 |
| 4,780,826 | 10/1988 | Nakano et al. . |
| 4,792,911 | 12/1988 | Gonzalez et al. ...................... 702/185 |
| 4,793,318 | 12/1988 | Tsursaki ...................... 123/676 |
| 4,819,601 | 4/1989 | Harada et al. ...................... 123/681 |
| 4,821,194 | 4/1989 | Kawamura . |
| 5,153,835 | 10/1992 | Hashimoto et al. . |
| 5,491,631 | 2/1996 | Shirane et al. ...................... 702/185 |

FOREIGN PATENT DOCUMENTS

| | | |
|---|---|---|
| 0 691 466 A1 | 1/1996 | European Pat. Off. . |
| 2 524 522 | 10/1983 | France . |
| 2-50043 | 4/1990 | Japan . |
| A-4-175439 | 6/1992 | Japan . |
| A-4-87854 | 7/1992 | Japan . |
| WO90/01631 | 2/1990 | WIPO . |

*Primary Examiner*—John Barlow
*Assistant Examiner*—Bryan Bui
*Attorney, Agent, or Firm*—Oliff & Berridge, PLC

[57] ABSTRACT

In the present invention, the cooling water temperature sensor is diagnosed using a warming up counter WCT. The value of WCT is increased by the increment WCTINC at predetermined intervals after the engine is started. The increment value WCTINC is determined in accordance with the engine operating parameters affecting the rising rate of the cooling water temperature such as the cooling water temperature when the engine is started, the ambient temperature and the engine load. Therefore, the value of the warming up counter accurately corresponds to the actual cooling water temperature. In the diagnosis operation, when the value of the counter WCT reaches a predetermined setting value, the cooling water temperature detected by the cooling water temperature sensor is compared with a reference temperature which corresponds to the setting value of the warming up counter. If the detected cooling water temperature is lower than the reference temperature, the cooling water temperature sensor is determined to have failed. Since the warming up counter which increases at a rate corresponding to the actual rising rate of the cooling water temperature is used, an accurate diagnosis of the cooling water temperature sensor is performed.

8 Claims, 11 Drawing Sheets

Fig.7

| INITIAL COOLING WATER TEMPERATURE \ INTAKE AIRFLOW RATE | GA<GA1 | GA1≦GA<GA2 | GA2≦GA |
|---|---|---|---|
| THWST<THWST1 | 1.0 | 1.0 | 1.0 |
| THWST1<THWST≦THWST2 | 0.5 | 1.0 | 1.5 |
| THWST2≦THWST | 0.5 | 1.0 | 1.5 |

DIAGNOSTIC SYSTEM FOR A COOLING WATER TEMPERATURE SENSOR

BACKGROUND OF THE INVENTION

1. Field of the Invention

The present invention relates to a diagnostic system for an internal combustion engine. More specifically, the invention relates to a diagnostic system that is capable of determining whether a cooling water temperature sensor of an engine has failed.

2. Description of the Related Art

An engine temperature is a very important parameter that represents the condition of the engine. Especially, in an engine equipped with an electronic control system, the engine temperature is used for various controls. Usually, a cooling water temperature of the engine is used in lieu of the engine temperature. For example, in an engine equipped with an air-fuel ratio control feedback system, the feedback control of the air-fuel ratio is started when the engine cooling water temperature becomes higher than a predetermined temperature. Further, the fuel injection amount at the engine start is determined in accordance with the initial cooling water temperature, i.e., the cooling water temperature when the engine is started. Even after the engine has started, various corrections are made on the fuel injection amount based on the cooling water temperature.

Therefore, it is very important to ensure that the cooling water temperature sensor works correctly in order to perform a proper engine control. For this purpose, various diagnostic systems for detecting the failure of the cooling water temperature sensor have been proposed. For example, Japanese Unexamined Utility Model Publication (Kokai) No. 2-50043 discloses one type of such a diagnostic system.

The diagnostic system in the '043 publication uses a counter which measures the time elapsed after the engine starts. The system determines that the cooling water temperature sensor of the engine has failed if the cooling water temperature detected by the sensor does not reach a predetermined reference value after a certain fixed time has lapsed since the start of the engine.

The reference value is set at an actual cooling water temperature when the fixed time lapsed after the engine started, and is determined by an experiment in which the engine is operated in the conditions where the cooling water temperature rises most slowly, for example, in the condition where the ambient temperature is very low. Namely, the reference value is determined by experiment at a lowest possible cooling water temperature when the predetermined time lapsed after the engine starts with a consideration of a reasonable margin.

However, if the failure of the cooling water temperature sensor is determined based on the output of the sensor when a fixed time has lapsed after the engine started, as in the system of the '043 publication, an error in the diagnosis may occur. For example, in the '043 publication, the reference value used for determining the failure of the sensor is selected at a value which is a sum of the lowest possible cooling water temperature after the fixed time has lapsed and a reasonable margin. Therefore, the reference value is set at a considerably low temperature.

Since the reference value is very low in the '043 publication, if the cooling water temperature rises in a normal rate, the actual cooling water temperature becomes considerably higher than the reference value when the fixed time has lapsed. In this case, the cooling water temperature detected by the cooling water temperature sensor becomes higher than the reference value even if the output of the sensor is lower than the actual temperature to some extent and, thereby a failed sensor in which the output characteristics has changed may be determined as being normal.

This type of the error in the diagnosis may be avoided if the reference value is set at a high temperature so that the temperature detected by the failed sensor is always lower than the reference value. However, when the reference value is set at a high temperature, a long time is required before the actual cooling water temperature rises to the reference value especially when the rate of the temperature rise is low. Thus, in this case, the period from the engine start to the start of the diagnosis must be set long enough so that the actual cooling water temperature reaches the reference value even in the condition where the rate of the cooling water temperature rise is the lowest. This causes the time required for diagnosing the cooling water temperature sensor to be unnecessarily long in the most operating range of the engine.

SUMMARY OF THE INVENTION

In view of the problems in the related art as set forth above, the object of the present invention is to provide a diagnostic system for a cooling water temperature sensor of an engine which is capable of correctly determining whether the sensor has failed, and is capable of shortening the time required for diagnosis in accordance with the engine operating condition.

This object is achieved by a diagnostic system, according to the present invention, for determining whether a cooling water temperature sensor for detecting a cooling water temperature of an internal combustion engine has failed. The system comprises a parameter detecting means for detecting an engine operating parameter which represents the engine operating conditions affecting a warming up of the engine, increment value setting means for setting an increment value based on the engine operating parameter, count means for incrementing a warming up counter, which represents degree of warming up of the engine, by the increment value at predetermined intervals, comparing means for comparing a cooling water temperature detected by a cooling water temperature sensor and a predetermined reference value when the value of the warming up counter reaches a predetermined setting value and determining means for determining that the cooling water temperature sensor has failed when the detected cooling water temperature is lower than the reference value.

According to the present invention, the engine operating parameter, which represents the engine operating conditions affecting the warming up of the engine, is detected. Parameters representing the amount of heat generated by the engine per unit time, such as the intake airflow rate of the engine, the intake air pressure, or the fuel injection amount per unit time can be used as the engine operating parameter. The engine operating parameter affects the rate of temperature rise of the cooling water.

Since the increment value of the warming up counter is determined in accordance with the detected engine operating parameter, and the warming up counter is increased by the increment value at predetermined intervals. Therefore, the value of the warming up counter increases at a rate corresponding to the rate of rise in the cooling water temperature. Therefore, when the value of the warming up counter reaches a setting value, the actual cooling water temperature should also reach a reference value which corresponds to the setting value, and the cooling water temperature sensor can be determined as having failed if the temperature detected by the sensor is lower than the reference value.

The increment value of the warming up counter is set at a value so that the increment value corresponds to the actual rate of rise of the cooling water temperature. Therefore, the rate of increase of the warming up counter corresponds to the actual rate of rise in the cooling water temperature. Consequently, when the actual rate of the rise in the cooling water temperature is large, the value of the warming up counter reaches the setting value in a short time after the engine starts, thereby the diagnosis can be completed in a short time after the engine starts. Conversely, when the rate of increase in the cooling water temperature is small, the time required for the warming up counter to reach the setting value, i.e., the time required for the diagnosis becomes longer accordingly. Thus, the time required for the diagnosis is automatically adjusted in accordance with the rate of increase in the cooling water temperature. Therefore, the cooling water temperature sensor can be diagnosed correctly while the time required for the diagnosis is shortened in accordance with the engine operating conditions.

BRIEF DESCRIPTION OF THE DRAWINGS

The present invention will be better understood from the description as set forth hereinafter, with reference to the accompanying drawings in which:

FIG. 7 shows an example of setting a factor used in the flowchart in FIGS. 5 and 6;

DESCRIPTION OF THE PREFERRED EMBODIMENT

Hereinafter, embodiments of the present invention will be explained in detail with reference to the accompanying drawings.

Figure 1:
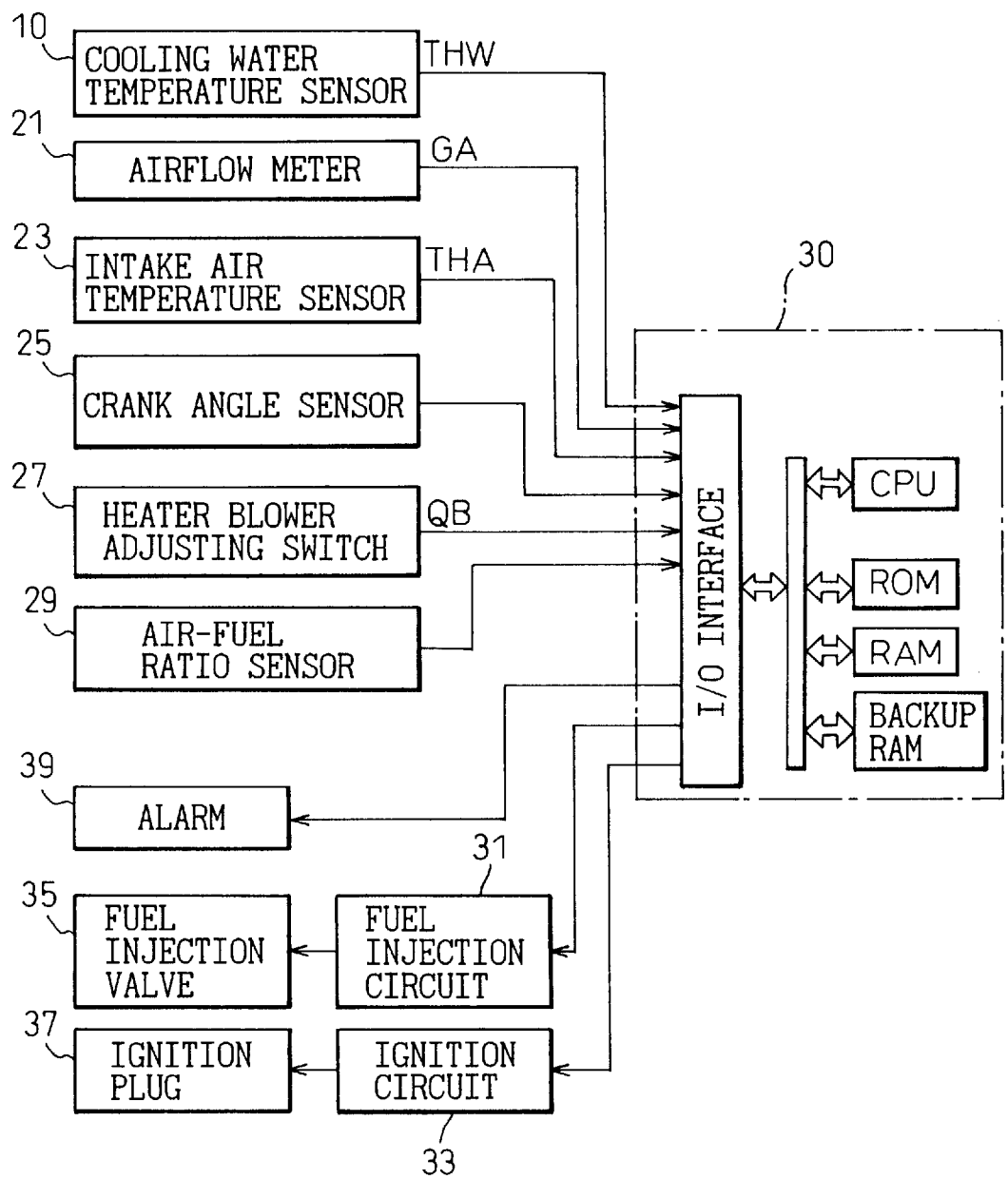
FIG. 1 schematically illustrates an embodiment of the diagnostic system according to the present invention.

FIG. 1 schematically illustrates an embodiment of the diagnostic system according to the present invention when it is applied to a vehicle engine. In FIG. 1, reference numeral 10 designates a cooling water temperature sensor of, for example, a thermistor type which is disposed in a cooling water passage (not shown) of an internal combustion engine. Numeral 30 in FIG. 1 represents an electronic control unit (ECU) of the engine. In this embodiment, the ECU 30 is comprised of a microcomputer of a known configuration including a RAM, ROM, CPU, input output (I/O) interface connected with each other by a bi-directional bus. The ECU 30 also includes a backup RAM that can maintain its memory contents even when the electric supply to the ECU 30 is switched off. In this embodiment, the ECU 30 performs basic control of the engine 1 such as the fuel injection control and the ignition timing control, and the ECU 30 in this embodiment further functions as the various means stated in claims such as increment value setting means, count means, comparing means and determining means, etc., in order to diagnose the cooling water temperature sensor.

For these controls, signals representing the operating conditions of the engine are supplied to the I/O interface of the ECU 30 from various sensors via an A/D converter (not shown). These signals are, for example, a signal from the cooling water temperature sensor 10 which represents the cooling water temperature THW, and a signal from airflow meter disposed in an intake air passage of the engine which corresponds to an intake airflow rate GA of the engine, and a signal from an intake air temperature sensor disposed in the intake air passage which corresponds to intake air temperature THA. Further, a pulse signal generated by a crank angle sensor 25 at predetermined rotation angle of the crankshaft is supplied to the I/O interface of the ECU 30. The ECU 30 calculates the engine rotation speed at regular interval based on the pulse signal. Further, a passenger compartment heater utilizing the cooling water of the engine is provided, and a signal representing the outlet airflow rate of the blower of the heater is supplied to the I/O interface of the ECU 30 from the heater blower adjusting switch 27.

Further, a signal from an air-fuel ratio sensor 29 disposed in an exhaust gas passage of the engine which represents an air-fuel ratio of the exhaust gas is supplied to the I/O interface of the ECU 30 via an A/D converter not shown in the drawing. The ECU 30 calculates the fuel injection amount based on the air-fuel ratio signal in order to control the air-fuel ratio of the engine at a predetermined target air-fuel ratio (for example, at the stoichiometric air-fuel ratio).

The I/O interface of the ECU 30 is connected to the respective fuel injection valve 35 of the engine via a fuel injection circuit 31, and to the respective ignition plugs 37 via an ignition circuit 33 in order to perform the fuel injection control and the ignition timing control, respectively. Further, the I/O port of the ECU 30 is connected to an alarm 39 disposed near the driver's seat of the vehicle.

In this embodiment, various controls are performed based on the cooling water temperature detected by the cooling water temperature sensor 10. For example, the ECU 30 determines the fuel injection amount at the engine start based on the detected cooling water temperature. Namely, the ECU 30 increases the fuel injection amount at the engine start as the cooling water temperature is lower in order to facilitate the engine start. Further, the ECU 30 starts the above-noted air-fuel ratio feedback control based on the output of the air-fuel ratio sensor 29 only when the detected cooling water temperature reaches a predetermined value (for example, 40° C.). Further, the ECU 30 calculates an increment of the fuel injection amount based on the detected cooling water temperature in order to compensate for the amount of injected fuel which attaches to the wall of the intake ports and does not reach the combustion chamber.

Since the cooling water temperature is used in the various controls as explained above, problems such as start failure of the engine, delay in the start of the air-fuel ratio feedback control or improper correction of fuel injection amount will occur if the cooling water temperature detected by the cooling water temperature sensor 10 is not correct. Therefore, in this embodiment, the ECU 30 determines whether the cooling water temperature sensor 10 has failed after the engine is started, and activates the alarm 39 in order to notify the driver of the failure when a failure of the cooling water temperature sensor 10 is detected. Next, the diagnosis of the cooling water temperature sensor 10 according to the present embodiment is explained.

In this embodiment, the cooling water temperature is estimated using a warming up counter WCT as explained later. When the estimated cooling water temperature becomes a predetermined reference temperature, i.e., when the value of the warming up counter reaches the value corresponding to the reference temperature, the temperature THW detected by the cooling water temperature sensor 10 is compared with the reference temperature. If the detected temperature THW is lower than the reference temperature, it is determined that the failure of the cooling water temperature sensor 10 such as a change in the output characteristics has occurred.

The warming up counter WCT is increased by an increment WCTINC at a predetermined interval after the engine starts. The amount of the increment WCTINC is determined in accordance with the value of the engine operating parameter which represents the engine operating conditions affecting the rising rate of the cooling water temperature. The rising rate of the cooling water temperature varies in accordance with the engine operating condition after it is started. However, the increment WCTINC of the warming up counter WCT is set in accordance with the engine operating condition, i.e., WCTINC is set at a large value when the rising rate of the actual cooling water temperature is large and is set at a small value when the rising rate is small in this embodiment. Therefore, the value of the warming up counter WCT accurately corresponds to the actual cooling water temperature after the engine started. Thus, if the temperature detected by the cooling water temperature sensor 10 does not reach the reference temperature when the value of the warming up counter reaches the setting value that corresponds to the reference temperature, this means that the cooling water temperature sensor 10 has failed.

The above-noted setting value of the warming up counter WCT is set at a value corresponding to the cooling water temperature at which the air-fuel ratio feedback control is started (for example, 40° C.) with consideration of a reasonable margin in this embodiment. Further, the rising rate of the cooling water temperature varies in accordance with the amount of heat generated by the engine per unit time, i.e., the rising rate of the cooling water temperature becomes large when the amount of heat generated by the engine per unit time is large. Therefore, in this embodiment, the value of the increment WCTINC is changed in accordance with the engine operating parameter, which represents the amount of heat generated by the engine per unit time. The intake airflow rate detected by the airflow meter 21, for example, can be used as the engine operating parameter representing the amount of the heat generated by the engine per unit time. Since the amount of fuel supplied to the engine per unit time is proportional to the intake airflow rate (the amount of intake air supplied to the engine per unit time), the amount of the heat generated by the engine is also proportional to the intake airflow rate.

Other parameters representing engine load, such as the intake air pressure (the intake manifold pressure), the amount of fuel supplied to the engine per unit time (i.e., the fuel injection amount multiplied by the engine rotational speed), and the degree of opening of the throttle valve, also may be used as the engine operating parameter in this embodiment.

Figure 2:
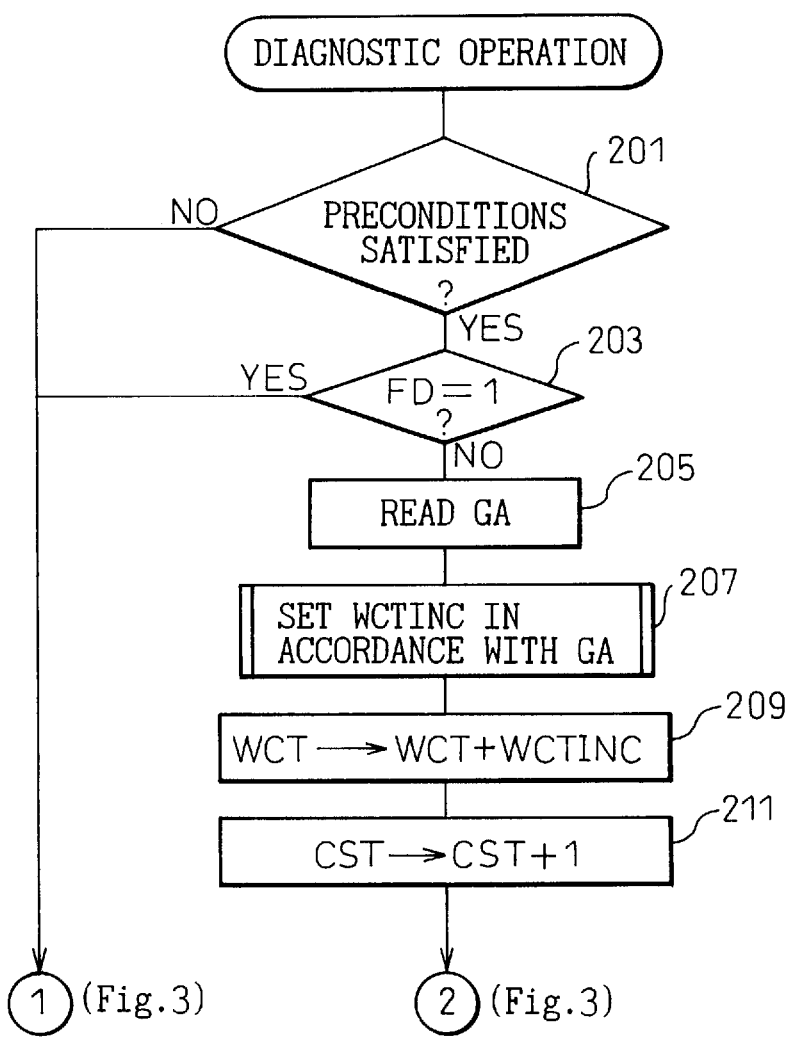
FIGS. 2 and 3 are a flowchart explaining an example of the diagnostic operation of the system in FIG. 1.
Figure 3:
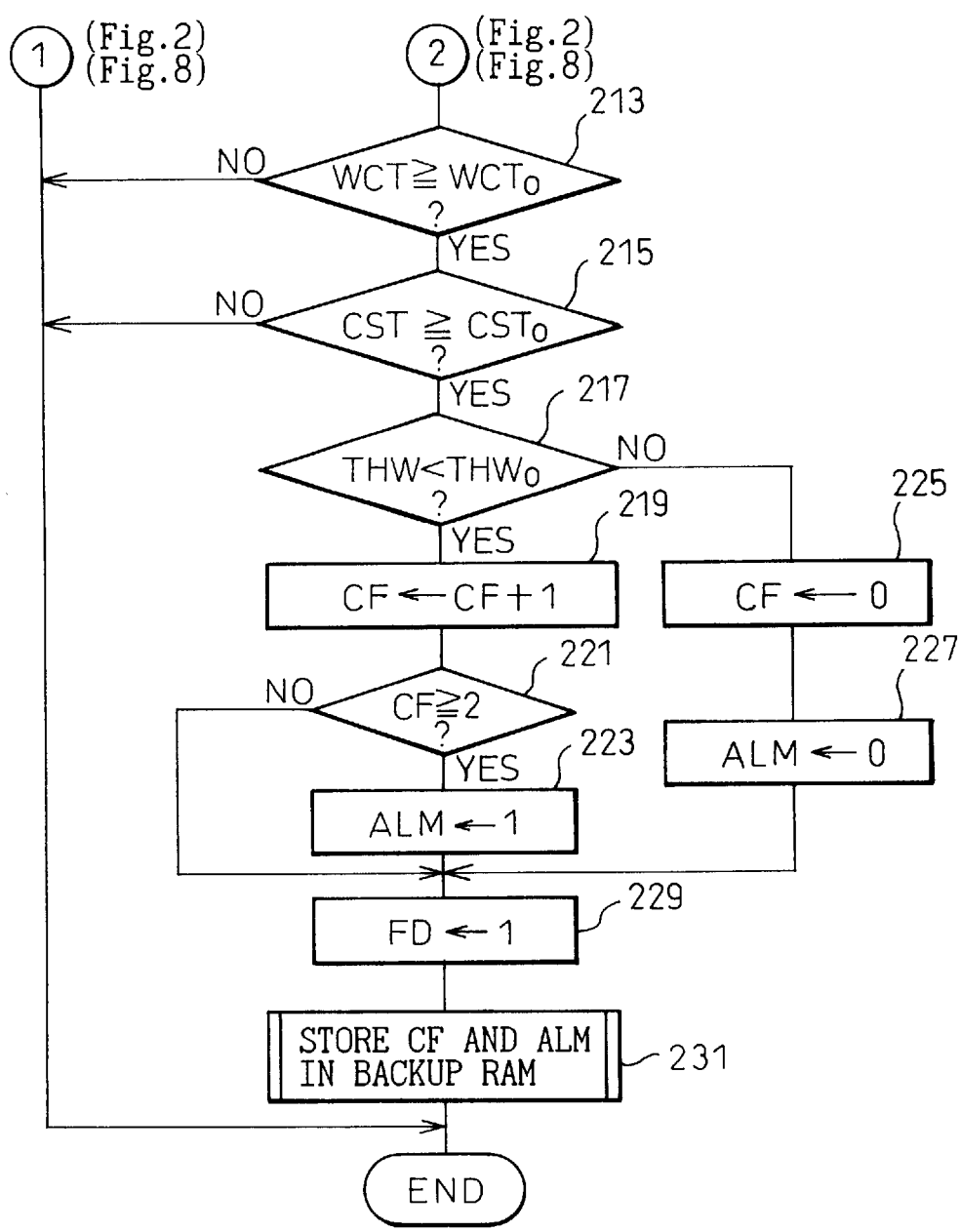

FIGS. 2 and 3 are a flowchart showing an embodiment of the diagnostic operation of the cooling water temperature sensor. The operation of FIGS. 2 and 3 are performed by the routine executed by the ECU at predetermined intervals.

In FIG. 2, at step 201, it is determined whether preconditions for performing the diagnosis are satisfied. The preconditions tested at step 201 are, for example, that the airflow meter 21 has not failed and that a breakage or disconnection of the wire has not occurred in the cooling water temperature sensor 10, etc. Since the intake airflow rate GA detected by the airflow meter 21 is used as the engine operating parameter in this embodiment, it is indispensable that the airflow meter 21 functions correctly. The failure of the airflow meter 21 and the breakage or disconnection of a wire in the cooling water temperature sensor 10 are detected by other routines (not shown) performed by the ECU 30. In this routine, it is determined that the airflow meter 21 has failed, or the breakage or disconnection of the wire in the cooling water temperature sensor 10 has occurred if the output of these sensors deviate largely from the normal range.

If the intake air pressure or degree of opening of the throttle valve is used as the engine operating parameter, it is determined whether the intake air pressure sensor or the throttle opening sensor has failed at step 201 as the preconditions for the diagnosis.

If any one of the preconditions is not satisfied at step 201, the routine immediately terminates without performing the diagnosis. If all of the preconditions are satisfied at step 201, the routine determines whether the value of a diagnosis completion flag FD is set at 1 at step 203. FD is a flag indicating whether the diagnosis of the cooling water temperature sensor has been completed since the engine is last started. The value of the flag FD is set to 0 when the engine starts, and is set to 1 at step 229 in FIG. 3 when the diagnosis is completed. If FD=1 at step 203, since this means that the diagnosis of the cooling water temperature sensor 10 has been performed and completed after the engine was last started, the routine terminates immediately without repeating the diagnosis. Therefore, the diagnosis of the cooling water temperature sensor 10 is performed only one time when the engine is started.

When FD≠1 at step 203, the routine reads the airflow rate GA detected by the airflow meter 21 at step 205 and sets the value of the increment WCTINC based on the airflow rate GA at step 207. The actual value of the counter increment WCTINC is determined by the experiment using the actual engine in which the rising rate of the cooling water temperature is measured by operating the engine at the various intake airflow rates GA. For example, the value of the counter increment WCTINC is set in accordance with the intake airflow rate GA in the following manner.

(1) When GA<GA1, WCTINC=0.5
(2) When GA1≦GA<GA2, WCTINC=1.0
(3) When GA2≦GA, WCTINC=1.5

At step 209, the value of the warming up counter WCT is increased by the increment WCTINC set at step 207. Further, at step 211, the value of a time counter CST is increased by 1. The values of the counters WCT and CST are set at 0 when the engine is started. Therefore, the value of the warming up counter WCT always corresponds to the temperature rise of the cooling water since the engine starts, and the value of the time counter CST corresponds the time elapsed since the engine started.

The intake airflow rate range GA<GA1 corresponds to an engine idle operation, GA1<GA<GA2 corresponds to the engine normal operating range (a low and medium load operation of the engine) and, GA2<GA corresponds to the high engine load operation (such as the acceleration) of the engine. Namely, at step 207, the value of the counter increment WCTINC is set at a larger value as the engine load becomes higher.

After increasing the values of the counters WCT and CST, the routine determines whether the value of the warming up counter WCT reaches a predetermined value $WCT_0$ at step 213 in FIG. 3. The value of the warming up counter WCT corresponds to the temperature rise of the cooling water after the engine started. However, since the temperature of the cooling water when the engine starts varies in accordance with the ambient temperature, the setting value $WCT_0$ is set at a value sufficiently large so that the actual cooling water temperature becomes higher than a predetermined reference temperature ($THW_0$) when the value of the warming up counter reaches $WCT_0$ even if the ambient temperature is low.

Then, at step 215, the routine determines whether the value of the time counter CST reaches a predetermined value $CST_0$, i.e., whether a predetermined time has lapsed since the engine started. The predetermined value $CST_0$ corresponds to a time sufficiently longer than the time required for the cooling water temperature to reach the reference temperature ($WCT_0$) in the normal condition and, for example, the value $CST_0$ in this embodiment corresponds to about 300 seconds.

If either of the warming up counter WCT and the time counter CST does not reach the predetermined value at steps 213 and 215, the routine terminates immediately without performing steps 217 to 231. If both of the values of the counters WCT and CST reach the predetermined values, the routine executes step 217 to determine whether the cooling water temperature THW detected by the sensor 10 reaches a reference temperature $THW_0$.

If the detected temperature TFIW is lower than $THW_0$ at step 217, since the actual cooling water temperature is higher than $THW_0$, this means that failure such as the change in the output characteristics has occurred in the cooling water temperature sensor 10. Therefore, in this case, the routine executes step 219 to increase the value of a failure counter CF by 1, and determines whether the value of the failure counter CF reaches 2 at step 221. When CF≧2 at step 221, the routine then executes step 223 to set the value of the failure flag ALM to 1. ALM is a flag representing the condition of the cooling water temperature sensor 10, and ALM=1 means that the cooling water temperature sensor 10 has failed. When the value of the failure flag ALM is set to 1, the alarm 39 is activated by a routine separately performed in order to notify the driver of the failure of the sensor 10.

If the detected temperature THW is higher than or equal to the reference temperature $THW_0$ at step 217, since the cooling water temperature sensor 10 is considered to be normal in this case, the routine sets the value of the failure counter CF to 0 at step 225, and sets the value of the failure flag ALM to 0 (normal) in order to deactivate the alarm 39.

Further, when CF<2 at step 221, the routine proceeds to step 229 without setting the value of the failure flag ALM to 1. Namely, in this embodiment, the failure flag ALM is set to 1 only when the cooling water temperature sensor 10 is determined as having failed in two successive engine starts. After completing the above-explained steps, the value of the diagnosis completion flag FD is set to 1 at step 229, and the io values of the failure counter CF and the failure flag ALM are stored in the backup RAM of the ECU 30. Then, the routine terminates.

Though the diagnosis is performed only when the value of the time counter CST, as well as the value of the warming up counter WCT, reaches the predetermined value in order to make sure that the actual cooling water temperature becomes higher than the reference temperature $THW_0$, the diagnosis may be carried out when only the value of the warming up counter WCT reaches the predetermined value $WCT_0$.

As explained above, since it is ensured that the actual cooling water temperature is higher than the reference temperature $THW_0$ when the diagnosis is performed, it is not required to set the reference temperature $THW_0$ at a marginally low value according to the present embodiment. Therefore, the cooling water temperature sensor 10 can be accurately diagnosed according to the present embodiment.

Next, another embodiment is explained with reference to FIG. 4. In the previous embodiment, the setting value $WCT_0$ (step 213 in FIG. 3) of the counter WCT is set at a constant regardless of the cooling water temperature when the engine started (hereinafter, the cooling water temperature when the engine started is referred to as "the initial cooling water temperature"). However, since the value of the warming up counter only represents the amount of temperature rise of the cooling water after the engine started, the actual cooling water temperature varies depending on the initial cooling water temperature even if the value of the warming up counter is the same. Therefore, the setting value $WCT_0$ is set at a relatively large value in the previous embodiment in order to ensure that the actual cooling water temperature reaches the reference temperature $THW_0$ when the warming up counter WCT reaches the setting value $WCT_0$ even if the initial temperature is low. However, this causes the time required for diagnosis to be unnecessarily long when the initial cooling water temperature is relatively high. In order to solve this problem, the setting value $WCT_0$ is changed in accordance with the initial cooling water temperature in this embodiment. Namely, in this embodiment, the value $WCT_0$ is set at a small value when the initial temperature is high in order to shorten the time required for the diagnosis when the initial cooling water temperature is high.

Figure 4:
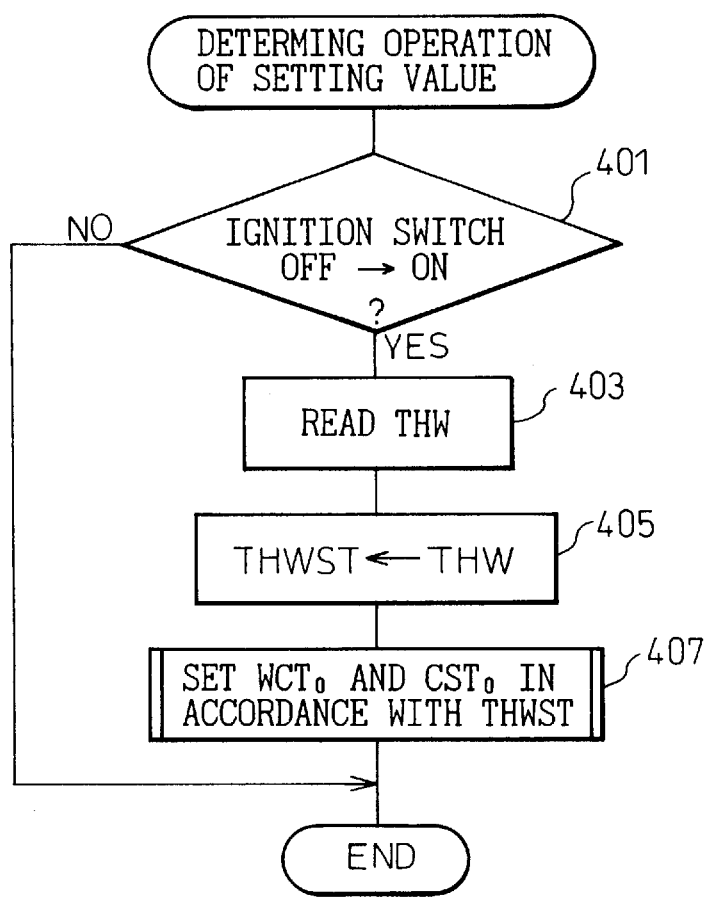
FIG. 4 is a flowchart explaining another example of the diagnostic operation of the system in FIG. 1.

FIG. 4 is a flowchart showing the determining operation of the setting value $WCT_0$ in this embodiment. This operation is carried out by the ECU 30 by a routine performed at regular intervals.

In FIG. 4, at step 401, it is determined whether the routine is first performed since the engine starting operation was carried out, i.e., whether the ignition switch is turned on since the routine was last performed, and if it is not the first execution of the routine since the engine starting operation, the routine immediately terminates without performing steps 403 to 407. Namely, the steps 403 to 407 are executed only once during the engine starting operation in order to set the value of $WCT_0$ in accordance with the initial cooling water temperature. When it is determined at step 401 that the routine is first performed since the engine starting operation was carried out, the routine proceeds to step 403 to read the cooling water temperature THW detected by the cooling water temperature sensor 10, and to step 405 to store this cooling water temperature as the initial cooling water temperature THWST. Further, at step 407, the routine determines the setting value $WCT_0$ for the warming up counter WCT and the setting value $CST_0$ of the time counter CST. The values of $WCT_0$ and $CST_0$ in this embodiment are determined based on the experiment in which the time required for the cooling water temperature to reach the reference temperature $THW_0$ is measured by starting the actual engine at various initial cooling water temperatures.

For example, the values of $WCT_0$ and $CST_0$ are set in accordance with the initial cooling water temperature THWST in the following manner in this embodiment.

(1) When THWST<THWST1, $WCT_0=WCT_1$, and $CST_0=CST_1$ (2) When THWST1≦THWST<THWST2, $WCT_0=WCT_2$, and $CST_0=CST_2$ (3) When THWST2<THWST, $WCT_0=WCT_3$, and $CST_0=CST_3$ THWST1 corresponds to the highest initial cooling water temperature when it is considered that the engine started at an extremely low ambient temperature, and is set at about −10° C. in this embodiment. THWST2 corresponds to the highest initial cooling water temperature when it is considered that the engine is started relatively low ambient temperature, and is set at about +10° C. in this embodiment. $WCT_1$, $WCT_2$, $WCT_3$ are set at values about 1200, 300 and 120, respectively, in this embodiment. Further, $CST_1$, $CST_2$, $CST_3$ are set at values corresponding to about 1200 seconds, 300 seconds and 120 second, respectively, in this embodiment. Namely, when the initial cooling water temperature THWST is low, both of the setting values $WCT_0$ and $CST_0$ are set at large values.

In this embodiment, when the setting values $WCT_0$ and $CST_0$ are determined in accordance with the initial cooling water temperature THWST by the routine in FIG. 4, the routine in FIGS. 2 and 3 is performed using the determined values of $WCT_0$ and $CST_0$. Therefore, when the initial cooling water temperature is relatively high, the diagnosis of the cooling water temperature sensor is completed in a relatively short time, and the time required for the diagnosis can be shortened in most cases (i.e., other than the case where the ambient temperature is extremely low).

Next, another embodiment of the present invention is explained. In the previous embodiments, increment WCTINC is determined in accordance with the engine operating parameter representing the amount of heat generated by the engine in a unit time (for example, the intake airflow rate). However, the rising rate of the cooling water temperature changes due to various factors even though the engine operating parameter such as the intake airflow rate is the same. For example, when the initial cooling water temperature is low, since the fuel injection amount is increased in order to accelerate the warming up of the engine, the rising rate of the cooling water temperature becomes larger compared to the case where the initial cooling water temperature is relatively high. Therefore, the increment WCTINC must be set at a large value when the initial cooling water temperature is low in order to estimate the actual cooling water temperature accurately by the warming up counter WCT.

Further, when a fuel cut operation is performed, for example, during deceleration of the vehicle, since fuel is not supplied to the engine, the rising rate of the cooling water temperature becomes very low. Moreover, if the fuel cut operation is performed for a long time, the cooling water temperature lowers. Therefore, when the fuel cut operation of the engine is performed, the increment WCTINC of the warming up counter WCT must be set at 0 or a negative value. Also, when the ambient temperature is low, or when the compartment heater system utilizing the cooling water as a heat source is activated, the rising rate of the cooling water temperature becomes low due to increase in the heat radiation from the cooling water system. Therefore, when the ambient temperature is low, or when the heater system is activated, the increment WCTINC of the warming up counter WCT must be set at a small value.

In this embodiment, the value of the increment WCTINC is corrected in accordance with the factors affecting the temperature rise of the cooling water. Therefore, the value of the warming up counter WCT represents the actual cooling water temperature more accurately.

Figure 5:
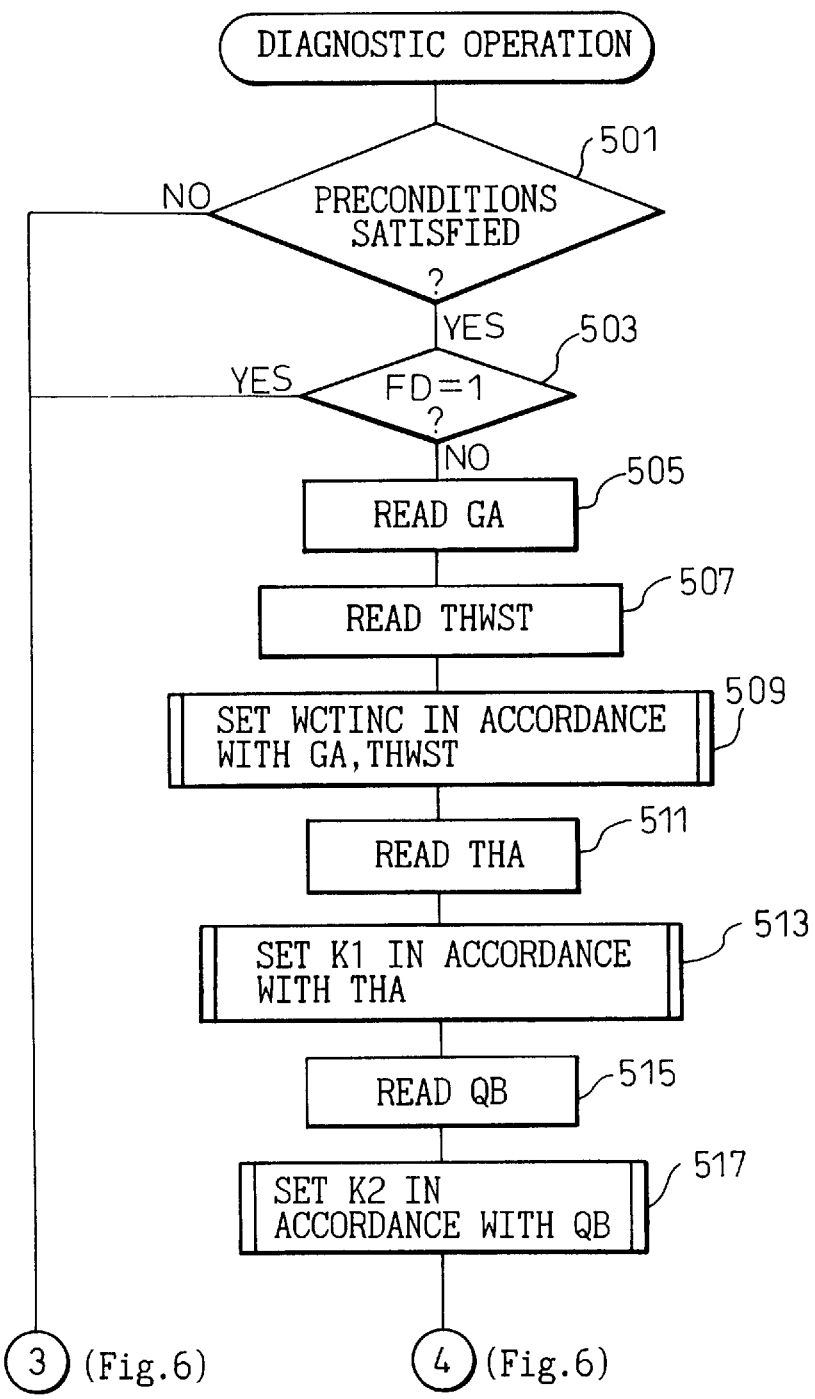
FIGS. 5 and 6 are a flowchart explaining another example of the diagnostic operation according to the present invention.
Figure 6:
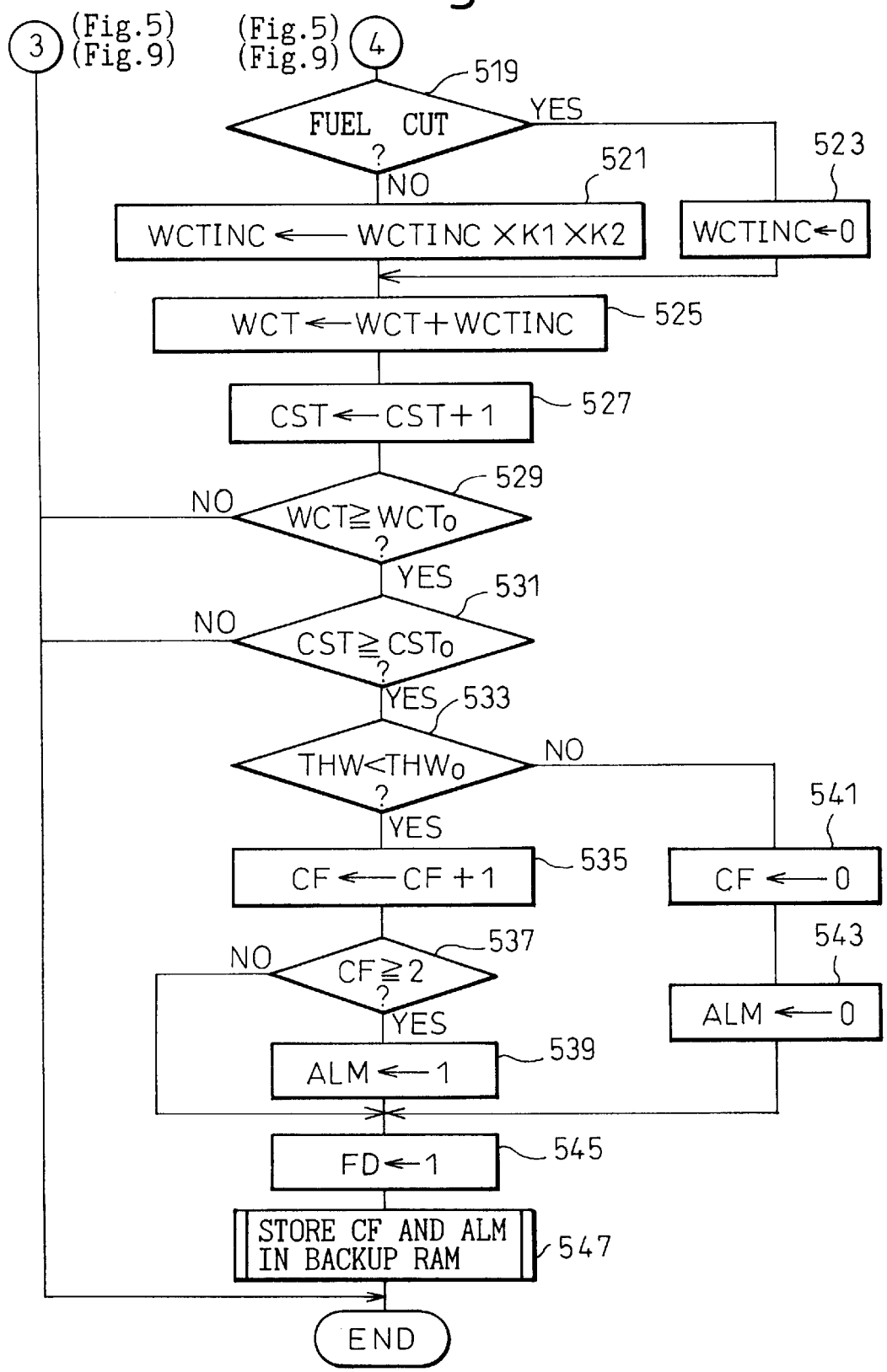

FIGS. 5 and 6 shows a flowchart of the diagnosis operation performed in this embodiment in lieu of the flowchart in FIGS. 2 and 3. This diagnosis operation is also performed by a routine executed by the ECU 30 at predetermined intervals (for example, 1 second).

In FIG. 5, at step 501, it is determined whether the preconditions for the diagnosis are satisfied and, at step 503, it is determined whether the diagnosis has completed. These steps are the same as steps 201 and 203 in FIG. 2. At steps 505 and 507, the intake airflow rate GA detected by the airflow meter 21 and the initial cooling water temperature THWST stored in the routine in FIG. 4 are read. Then, at step 509, the value of the increment WCTINC determined in accordance with the intake airflow rate GA is further corrected based on the initial cooling water temperature THWST.

FIG. 7 shows the values of the increment WCTINC after it is corrected in accordance with the initial cooling water temperature THWST. In FIG. 7, the intake airflow rate range GA<GA1 corresponds to an engine idle operation, GA1≦GA<GA2 corresponds to the engine normal operating range (a low and medium load operation of the engine) and, GA2≦GA corresponds to the high load operation (such as the acceleration) of the engine. Further, THWST1 corresponds to the highest initial cooling water temperature when it is considered that the engine is started at an extremely low ambient temperature, and is set at about −10° C. in this embodiment. THWST2 corresponds to the highest initial cooling water temperature when it is considered that the engine is started at a relatively low ambient temperature, and is set at about +10° C. in this embodiment.

As can be seen from FIG. 7, the value of the increment WCTINC is generally set at a larger value as the engine load is larger in the manner similar to the embodiment in FIGS. 2 and 3. However, when the ambient temperature is extremely low (i.e., when THWST<THWST1), the value of the increment WCTINC is set at a larger value than other cases. The relationship between WCTINC and GA, THWST are obtained by experiment, and stored in the ROM of the ECU 30 in this embodiment.

Further, at steps 511 through 517, correction factors K1 and K2 are determined in accordance with the ambient temperature THA and an outlet airflow rate of the blower of the compartment heater, respectively. As explained later, the value of the increment WCTINC determined at step 509 is further corrected by the correction factors K1 and K2 before used for increasing the warming up counter WCT.

Step 511 and 513 are the steps for determining the value of the correction factor K1 based on the ambient temperature THA. In this embodiment, the intake air temperature detected by the intake air temperature sensor 23 is used as the ambient temperature THA. Namely, intake air temperature THA detected by the intake air temperature sensor 23 is read at step 511, and the correction factor K1 is determined at step 513 in accordance with the temperature THA. The value of the correction factor K1 is determined by experiment in which the actual engine is operated at various ambient temperatures and, in this embodiment, the values of the correction factor K1 is set in the following manner.

(1) When THA<THA1, K1=0.5
(2) When THA≧THA1, K1=1.0

In this embodiment, THA1 is the ambient temperature around 0° C. Namely, when the ambient temperature THA is low (THA<THA1), the correction factor K1 is set at a small value in order to decrease the value of the increment WCTINC, as explained later.

Steps 515 and 517 are the steps for determining the value of the correction factor K2 in accordance with the outlet airflow rate of the compartment heater blower. Namely, at step 515, the setting QB of the adjusting switch 27 of the outlet airflow rate of the compartment heater blower is read from the setting of the adjusting switch 27 and, at step 517, the value of the correction factor K2 is determined in accordance with QB. The actual value of K2 is determined by experiment using the actual engine. In this embodiment, the outlet airflow rate QB of the heater blower is divided into three flow rate ranges, and the value of the correction factor K2 is determined based on the flow rate ranges in the following manner.

(1) When QB is set at HIGH (the flow rate is large),
    K2=0.75
(2) When QB is set at MEDIUM (the flow rate is medium),
    K2=0.85
(3) When QB is set at LOW (the flow rate is low),
    K2=1.0

Namely, the value of the correction factor K2 is set at a smaller value as the outlet airflow rate of the compartment heater blower becomes large in order to decrease the value of the increment WCTINC.

Steps 519 through 523 represent the correction of the increment WCTINC in accordance with the fuel cut operation. At step 519, it is determined whether the fuel cut operation is carried out at present. If the fuel cut operation is being carried out, since no heat is generated by the engine and the rising rate of the cooling water temperature becomes very small, the routine proceeds to step 523 to set the value of the increment WCTINC at 0. If the fuel cut operation is not carried out at step 519, the value of the increment WCTINC determined at step 509 is corrected by multiplying it with the correction factors K1 and K2. Though the value of the increment WCTINC is set at 0 during the fuel cut operation of the engine in this embodiment, the cooling water temperature decreases if the fuel cut operation is performed for a long time. Therefore, in addition to steps 519 and 523, the value of the increment WCTINC may be set at a negative value when the fuel cut operation is performed for a long time.

In this embodiment, the diagnosis of the cooling water temperature 10 is carried out at steps 525 through 527 using the increment WCTINC after it is corrected. Steps 525 through 547 are the same as steps 209 through 231 in FIGS. 2 and 3, and the detailed explanation is not given here.

Although only the above explained factors affecting the rising rate of the cooling water temperature are considered in this embodiment, other factors may be also considered to correct the value of the increment WCTINC. For example, the amount of heat generated by the engine per unit time becomes larger when the engine speed is high than when the engine speed is low. Therefore, the value of the increment WCTINC may be corrected in accordance with the engine speed in such a manner that the value of the WCTINC becomes larger as the engine speed becomes higher. Further, in the vehicle engine, the radiation of heat from the cooling water system increases when the vehicle travels at a high speed due to the wind caused by the vehicle travel. Therefore, the value of the increment WCTINC may be decreased in accordance with the traveling speed of the vehicle.

As explained above, the value of the increment WCTINC in this embodiment is corrected in accordance with the factors affecting the rising rate of the cooling water temperature, and the value of the warming up counter WCT in this embodiment accurately represents the actual cooling water temperature. Therefore, the accuracy of the diagnosis is largely improved in this embodiment.

Next, another embodiment of the present invention is explained with reference to FIGS. 8 to 10.

In this embodiment, the diagnosis of the cooling water temperature sensor is prohibited when the cooling water temperature becomes lower than the initial cooling water temperature. Usually, the cooling water temperature only increases after the engine started, and the cooling water temperature is always higher than the initial cooling water temperature. However, in the case where a cylinder block heater which heats the cylinder block of the engine when the ambient temperature is very low is used, the cooling water temperature may become lower than the initial cooling water temperature due to the circulation of the cold cooling water after the engine started. Further, the cooling water temperature may become lower than the initial cooling water temperature if a cold cooling water is charged for the replacement or making up of the cooling water after the engine started. If these occur, since the value of the warming up counter does not accurately correspond to the actual cooling water temperature, the cooling water temperature sensor cannot be correctly diagnosed. Therefore, in order to prevent the error in the diagnosis, the diagnosis is prohibited in the diagnostic operation in FIGS. 2, 3 and FIGS. 5, 6 when the cooling water temperature becomes lower than the initial cooling water temperature in this embodiment.

Figure 8:
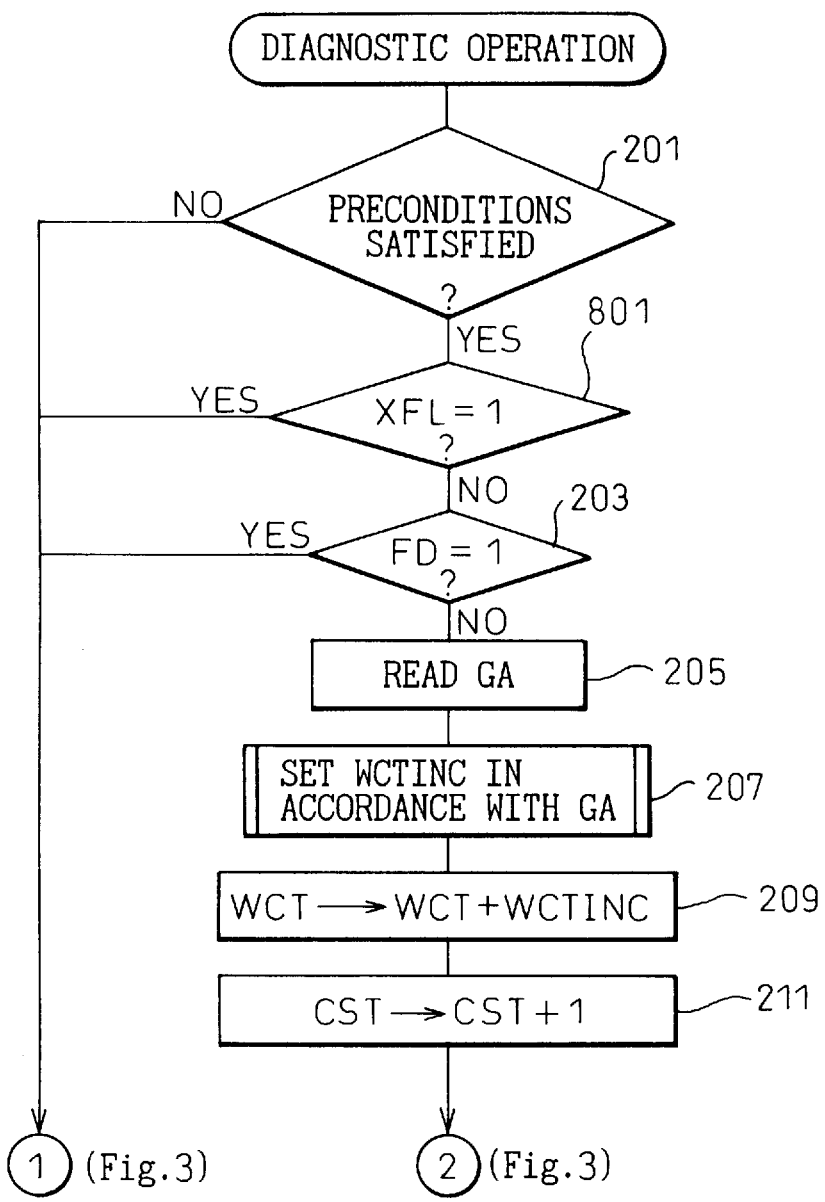
FIG. 8 shows a part of a flowchart which explains another example of the diagnostic operation according to the present invention.
Figure 9:
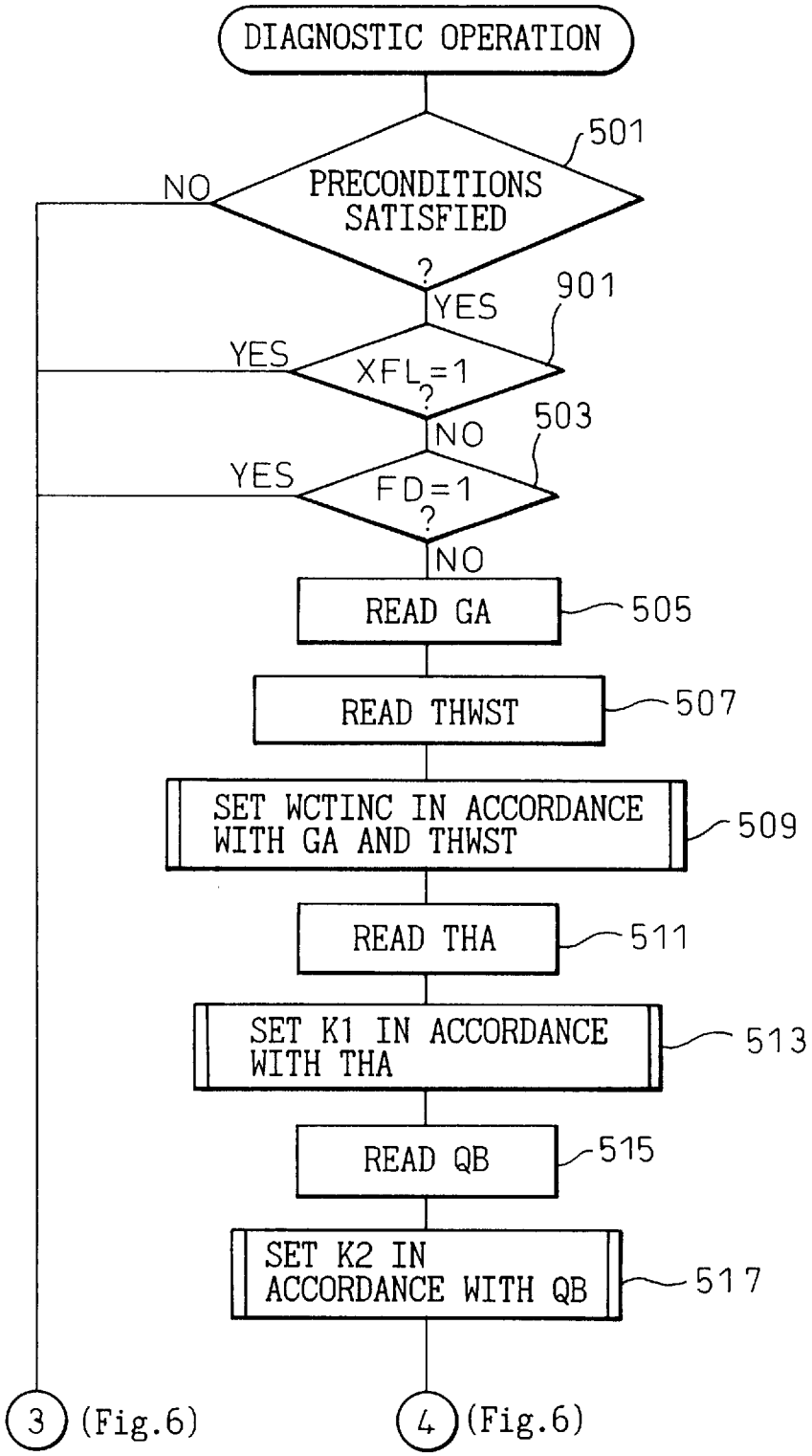
FIG. 9 shows a part of a flowchart which explains another example of the diagnostic operation according to the present invention.

FIGS. 8 and 9 show a part of a flowchart that corresponds to the part of the flowchart shown in FIGS. 2 and 5, respectively. FIGS. 8 and 3 form a flowchart that shows an embodiment of the diagnostic operation, and FIGS. 9 and 6 forms a flowchart that shows another embodiment of the diagnostic operation.

The flowchart in FIG. 8 is different from the flowchart in FIG. 2 in that step 801 is added between steps 201 and 203 in FIG. 2. Similarly, the flowchart in FIG. 9 is different from the flowchart in FIG. 5 in that step 901 is added between steps 501 and 503 in FIG. 5.

At step 801 in FIG. 8 and at step 901 in FIG. 9, it is determined whether the value of a flag XFL is set at 1, and if XFL=1, the routines in FIG. 8 and FIG. 9 terminate immediately without executing steps 203 through 231 and steps 503 through 547, respectively. XFL in this embodiment is a prohibition flag that is set at 1 by the routine in FIG. 10 when the cooling water temperature is lower than the initial cooling water temperature.

Figure 10:
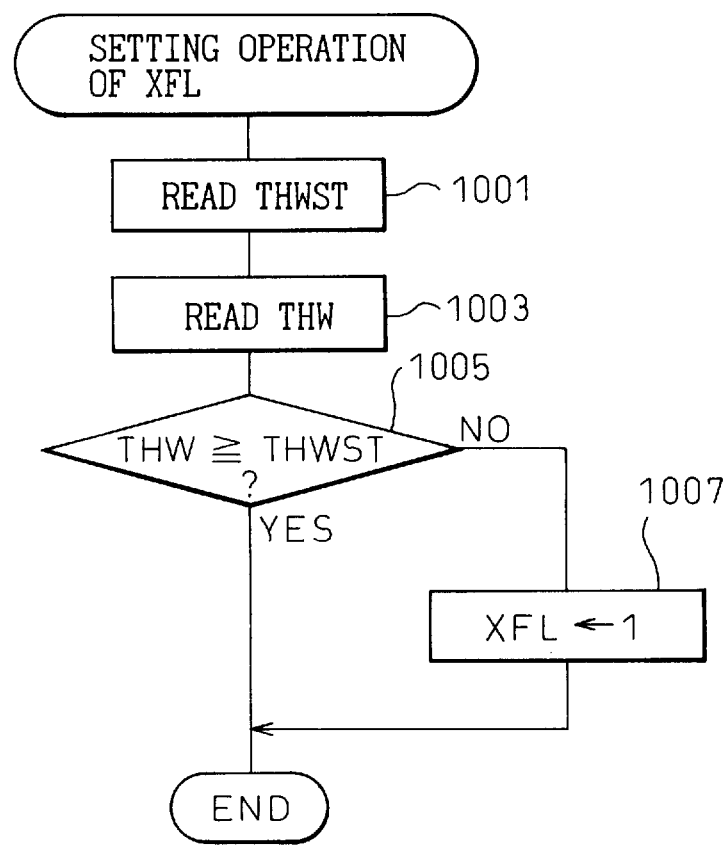
FIG. 10 shows a flowchart explaining another example of the diagnostic operation according to the present invention.

FIG. 10 is the flowchart showing the setting routine of the value of the prohibition flag XFL. This routine is performed by the ECU 30 at predetermined intervals. in FIG. 10, at steps 1001 and 1003, the initial cooling water temperature THWST stored in the routine in FIG. 4 and the cooling water temperature THW detected by the cooling water temperature sensor 10 is read. Then, at step 1005, it is determined whether the cooling water temperature THW is higher than or equal to the initial cooling water temperature THWST. If THW<THWST at step 1005, the value of the prohibition flag XFL is set to 1 at step 1007 and, if THW≧THWST at step 1005, the routine terminates without changing the value of the flag XFL. The value of the flag XFL is set to 0 when the engine is started. Therefore, the value of the flag XFL is maintained at 0 as long as THW≧THWST by the routine in FIG. 10, and the diagnostic operation of steps 203 through 231 in FIGS. 8 and 3, and steps 503 through 541 in FIGS. 9 and 6 are carried out. However, if the cooling water temperature THW becomes lower than the initial cooling water temperature THWST, since the value of the flag XFL is set to 1 at step 1007 in FIG. 10, the diagnostic operations in FIGS. 8 and 3 and FIGS. 9 and 6 are prohibited until the value of the flag XFL is set to 0 when the engine is next started. Therefore, according to this embodiment, the diagnostic operation is not performed when the value of the warming up counter WCT deviates from the actual cooling water temperature, whereby an error in the diagnosis is prevented.

Figure 11:
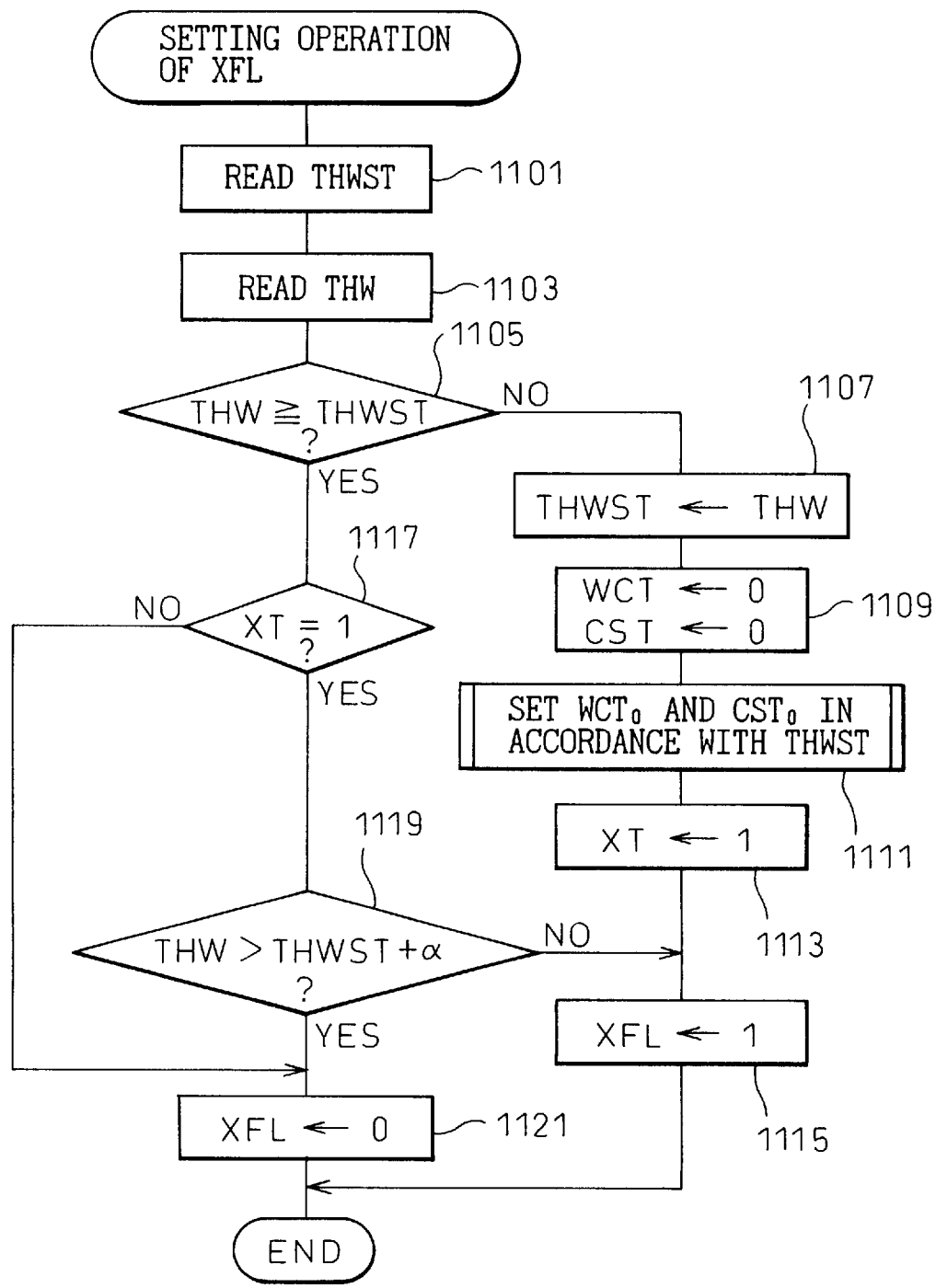
FIG. 11 shows a flowchart explaining another example of the diagnostic operation according to the present invention.

Next, another embodiment is explained with reference to FIG. 11. FIG. 11 is a flowchart showing the setting routine of the value of the prohibition flag XFL that is different from FIG. 10. In this embodiment, similarly to the embodiment in FIG. 10, the diagnostic operations in FIGS. 8 and 3 and FIGS. 9 and 6 are prohibited when the value of the flag XFL is set to 1. However, in this embodiment, the diagnostic operation is newly started from the time when the cooling water temperature THW becomes lower than the initial cooling water temperature THWST in order to increase the frequency of the diagnosis.

Namely, in this embodiment, when the cooling water temperature THW detected by the cooling water temperature sensor 10 becomes lower than the initial temperature THWST stored by the routine in FIG. 4, the value of the warming up counter WCT is set to 0 and, at the same time, the present cooling water temperature THW is stored as the initial cooling water temperature THWST (i.e., the value of the THWST stored by the routine in FIG. 4 is replaced with the present cooling water temperature THW). Then, the diagnostic operation is newly started using the new value of the initial cooling water temperature. Since the value of the warming up counter is set to 0 when the THW becomes lower than THWST, the value of the warming up counter WCT corresponds to the amount of the temperature rise of the cooling water from the time when the cooling water temperature becomes lower than the initial cooling water temperature. Further, the cooling water temperature THW when the warming up counter WCT is set to 0 is stored as the new value of the initial cooling water temperature THWST. Therefore, the value of the warming up counter WCT accurately corresponds to the actual cooling water temperature when the diagnostic operation is restarted, and the diagnostic operation is performed accurately.

In FIG. 11, at steps 1101 and 1103, the initial cooling water temperature THWST and the present cooling water temperature THW are read. Further, it is determined whether the present cooling water temperature THW is larger than or equal to the initial cooling water temperature THWST at step 1105.

If the present cooling water temperature is lower than the initial cooling water temperature at step 1105, the value of the THWST stored in the routine in FIG. 4 is replaced with the present cooling water temperature THW read at step 1103, and THW read at step 1103 is stored as a new value of the initial cooling water temperature THWST. Therefore, the cooling water temperature detected by the cooling water temperature sensor at step 1103 is read at step 1101 as the initial CST THWST when the routine is next performed. Then, at step 1109, the values of the warming up counter WCT and the time counter CST are set at 0. Further, the setting values $WCT_0$ and $CST_0$ of the warming up counter and the time counter, respectively, are newly determined in accordance with the newly stored value of the initial cooling water temperature THWST. After determine the new values of $WCT_0$ and $CST_0$, the value of a flag XT is set to 1 at step 1113. XT is a flag, which has the function that step 1119 is performed only when the condition THW<THWST has occurred after the engine started. Due to the function of the flag XT, step 1119 is skipped if the condition THW<THWST has not occurred since the engine started. After setting the value of the flag XT at 1 at step 1113, the routine sets the value of the prohibition flag XFL to 1, and terminates.

On the other hand, if THW≧THWST at step 1105, the routine proceeds to step 1117 to determine whether the value of the flag XT is set at 1, i.e., whether THW has become lower than THWST since the engine started. If XT≠1 at step 1117, i.e., if THW is always higher than THWST since the engine started, the routine directly proceeds to step 1121 to set the value of the prohibition flag XFL to 0. In this case, the diagnostic operations in FIGS. 8 and 3 and FIGS. 9 and 6 are continued.

If XT=1 at step 1117, i.e., if the condition THW<THWST has occurred since the engine started, the routine executes step 1119 to determine whether the present cooling water temperature is higher than THWST newly stored at step 1107 by more than a predetermined value α. The value of the prohibition flag XFL is set to 1 at step 1115, i.e., the diagnostic operation is prohibited as long as THW≦THWST+α, and only when THW becomes higher than THWST+α, the value of the flag XFL is set to 0 at step 1121 and the diagnostic operation in FIGS. 8 and 3 and FIGS. 9 and 6 are permitted.

Namely, in this embodiment, when THW becomes lower than THWST, the diagnostic operation is not permitted until the cooling water temperature increases by α (α≈5° C.) in order to prevent the diagnostic operation from being started and stopped frequently due to a slight change in the cooling water temperature.

As explained above, according to the present embodiment, the diagnosis of the cooling water temperature sensor is carried out even if the cooling water temperature becomes lower than the initial cooling water temperature by restarting the diagnostic operation using the new initial cooling water temperature. Therefore, according to the present embodiment, accurate diagnosis is performed without lowering the frequency of the diagnostic operation.

We claim:

1. A diagnostic system, for determining whether a cooling water temperature sensor for detecting a cooling water temperature of an internal combustion engine has failed, comprising:

a parameter detecting means for detecting an engine operating parameter which represents the engine operating conditions affecting a warming up of the engine;

increment value setting means for setting an increment value based on said engine operating parameter;

count means for increasing a warming up counter, which represents degree of warming up of the engine, by said increment value at predetermined intervals;

comparing means for comparing a cooling water temperature detected by a cooling water temperature sensor and a predetermined reference value when the value of said warming up counter reaches a predetermined setting value; and determining means for determining that the cooling water temperature sensor has failed when the detected cooling water temperature is lower than said predetermined reference value.

2. A diagnostic system according to claim 1, wherein said comparing means changes said setting value of the warming up counter in accordance with an initial cooling water temperature which is defined as a cooling water temperature when the engine started.

3. A diagnostic system according to claim 1, wherein said increment value setting means includes correction means for correcting said increment value based on an initial cooling water temperature which is defined as a cooling water temperature when the engine started, and wherein said count means increases the warming up counter by the increment value after it is corrected at predetermined intervals.

4. A diagnostic system according to claim 1, wherein said increment value setting means includes correction means for correcting said increment value based on the ambient temperature, and wherein said count means increases the warming up counter by the increment value after it is corrected at predetermined intervals.

5. A diagnostic system according to claim 1, wherein said increment value setting means includes correction means for correcting said increment value based on the outlet airflow rate of a compartment heater blower, and wherein said count means increases the warming up counter by the increment value after it is corrected at predetermined intervals.

6. A diagnostic system according to claim 1, wherein said increment value setting means sets the increment value at a value smaller than or equal to 0 when a fuel cut operation of the engine is performed.

7. A diagnostic system according to claim 1, further comprising a prohibiting means for prohibiting said determining means from determining whether the cooling water temperature sensor has failed when the cooling water temperature detected by the cooling water temperature sensor is lower than an initial cooling water temperature which is defined as a cooling water temperature when the engine started.

8. A diagnostic system according to claim 1, further comprising reset means for setting the value of said warming up counter at 0 when the present cooling water temperature detected by the cooling water temperature sensor is lower than an initial cooling water temperature which is the cooling water temperature stored when the engine is started, and wherein said reset means further replaces the value of the stored initial cooling water temperature with the present cooling water temperature detected by the cooling water temperature sensor when the present cooling water temperature detected by the cooling water temperature sensor is lower than said initial cooling water temperature.

* * * * *

UNITED STATES PATENT AND TRADEMARK OFFICE
CERTIFICATE OF CORRECTION

PATENT NO. : 5,884,243
DATED : March 16, 1999
INVENTOR(S) : Satoru TANIGUCHI; Kazunori KATOH; Koichi MIZUTANI; and Hideo MORI It is certified that error appears in the above-identified patent and that said Letters Patent is hereby corrected as shown below:

Title page, in item [30] Foreign Application Priority Data, line 1, change "Mar. 24, 1996" to --June 24, 1996--.

Signed and Sealed this

Third Day of August, 1999

Attest:

Q. TODD DICKINSON

*Attesting Officer*   *Acting Commissioner of Patents and Trademarks*